(12) United States Patent
Nakamura (10) Patent No.: US 7,315,504 B2
(45) Date of Patent: Jan. 1, 2008

(54) OPTICAL PICKUP APPARATUS AND MANUFACTURING METHOD THEREOF

(75) Inventor: Masahiro Nakamura, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 392 days.

(21) Appl. No.: 10/387,839

(22) Filed: Mar. 14, 2003

(65) Prior Publication Data

US 2003/0179677 A1    Sep. 25, 2003

(30) Foreign Application Priority Data

Mar. 20, 2002 (JP) .............................. 2002-078716
Feb. 3, 2003 (JP) .............................. 2003-025800

(51) Int. Cl.
*G11B 7/00* (2006.01)

(52) U.S. Cl. ..................... 369/116; 369/112; 369/44.15

(58) Field of Classification Search ..................... None
See application file for complete search history.

(56) References Cited

U.S. PATENT DOCUMENTS 4,427,281 A * 1/1984 Yamada ....................... 396/384
5,345,432 A * 9/1994 Kasahara et al. ........ 369/44.15
5,500,846 A * 3/1996 Ophey ......................... 369/116
5,956,314 A * 9/1999 Ishimatsu et al. ........... 720/693
6,038,203 A * 3/2000 Tajiri et al. ............... 369/112.1
6,208,609 B1 * 3/2001 Hang et al. ............. 369/112.26
6,317,400 B1   11/2001 Yanagawa et al.
6,463,023 B1 * 10/2002 Miura ....................... 369/53.26
2001/0043520 A1 * 11/2001 Yanagisawa et al. .... 369/44.11
2001/0046200 A1 * 11/2001 Saeki ..................... 369/112.07

FOREIGN PATENT DOCUMENTS

| JP | H2-128218 U1 | 10/1990 |
| JP | 2000-021001 | 1/2000 |
| JP | 2002-100069 | 4/2002 |
| JP | 2002-251775 | 9/2002 |
| JP | 2002-298421 | 10/2002 |
| JP | 2003-132552 | 5/2003 |

* cited by examiner

*Primary Examiner*—William R. Korzuch
*Assistant Examiner*—Tawfik Goma
(74) *Attorney, Agent, or Firm*—Morrison & Foerster LLP (57) ABSTRACT

A front monitor-type optical pickup apparatus is composed of a window 10w for taking in a laser light beam, and a housing 10 for housing a front monitor detector 9 so as to face the window 10w. In the housing 10, the position of the front monitor detector 9 is adjustable. The optical pickup apparatus makes it possible to eliminate dispersion in quantity of incident light upon the front monitor detector attributed to component and assembly dispersion.

6 Claims, 7 Drawing Sheets

OPTICAL PICKUP APPARATUS AND MANUFACTURING METHOD THEREOF

BACKGROUND OF THE INVENTION

The present invention relates to an optical pickup apparatus for reading information from an information recording medium and writing information onto the information recording medium with use of a laser light beam. More specifically, the present invention relates to a front monitor-type optical pickup apparatus, that is an optical pickup apparatus which emits a laser light beam to the information recording medium from a laser light source and detects quantity of the laser light so as to execute feedback control of the output power from the laser light source.

It is noted that typical examples of the information recording medium include DVD (Digital Video Disk) and CD (Compact Disk).

Further, the present invention relates to a manufacturing method for manufacturing such front monitor-type optical pickup apparatuses.

Figure 1:
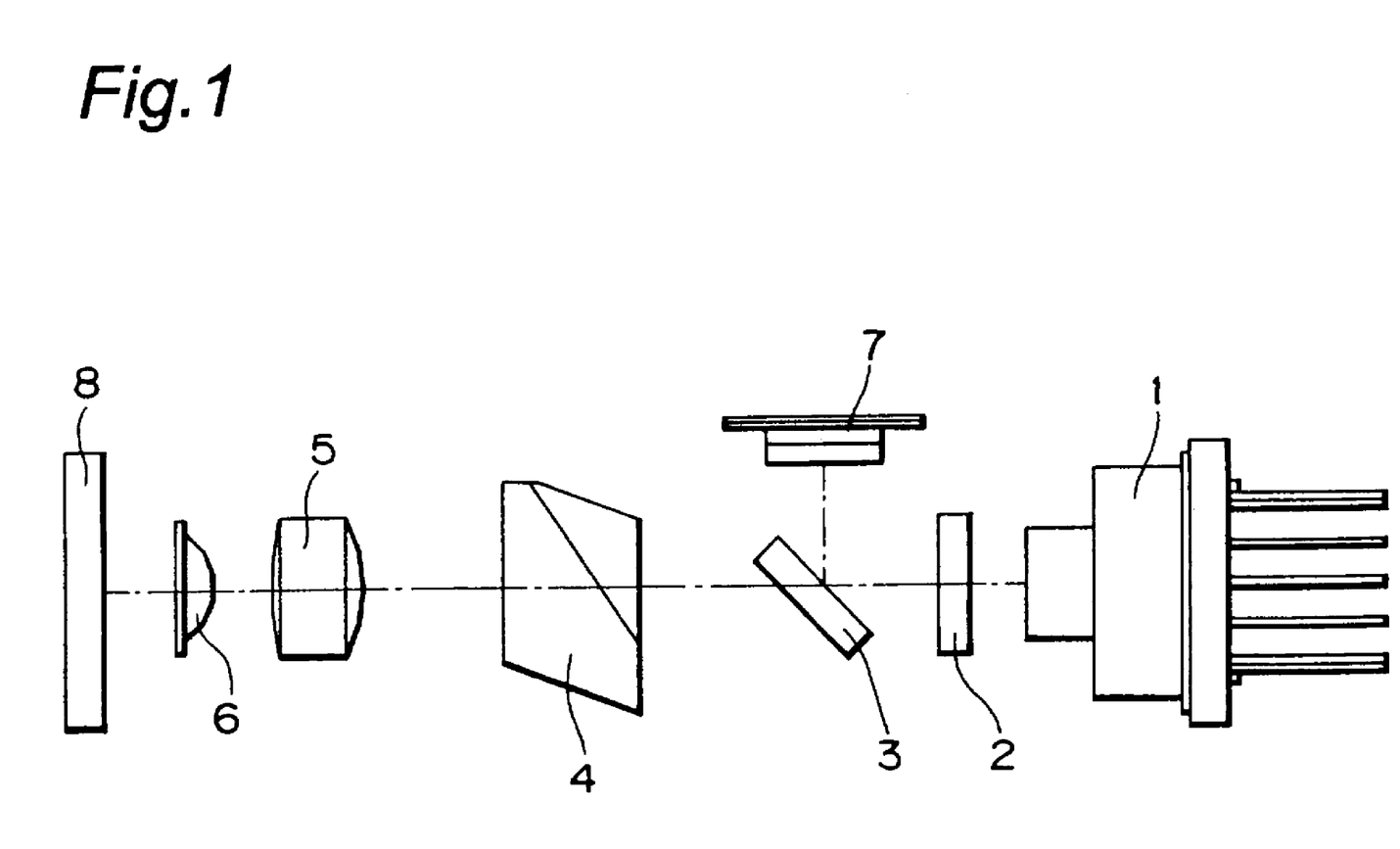
FIG. 1 is a view showing the basic configuration of a front monitor-type optical pickup apparatus.

This kind of the front monitor-type optical pickup apparatus is basically composed of a diffraction grating 2, a reflection mirror 3, a beam splitter 4, a collimate lens 5 and an object lens 6 disposed along a route of a laser light beam emitted by a semiconductor laser 1 toward an information recording medium (optical disk) 8, and also provided with a front monitor detector 7 as shown in FIG. 1. The laser light beam emitted from the semiconductor laser 1 is radiated to the optical disk 8 through the diffraction grating 2, the beam splitter 4, the collimate lens 5 and the object lens 6. At the same time, part of the laser light beam is reflected by the reflection mirror 3 and comes into the front monitor detector 7, and the front monitor detector 7 detects quantity of the incident light beam. Then, an unshown feedback control system executes feedback control of the driving current supplied to the semiconductor laser 1 so as to keep the output level from the front monitor detector 7 constant, thereby keeping the output power from the semiconductor laser 1 at a constant rate (refer to Japanese Patent Laid-Open Publication No. 2000-21001 (Paragraph 0004-0008 on P2, FIG. 3)).

The above-mentioned front monitor detector 7 is housed in an unshown housing whose upper portion is opened. Conventionally, the inner size of the housing is set substantially equal to the size of the front monitor detector 7 (more properly including a flexible substrate with the front monitor detector 7 mounted thereon). In assembling an optical pickup apparatus, the front monitor detector 7 is inserted into the housing from the upward side. The front monitor detector 7 is fit into the housing, and secured in the position where the front monitor detector 7 is in contact with the bottom face of the housing. Thus, mounting accuracy of the front monitor detector 7 on the housing has been conventionally attempted to be increased by coinciding the inner size of the housing with the size of the front monitor detector 7.

In the front monitor-type optical pickup apparatus, due to component and assembly dispersion such as radiation characteristics dispersion of the semiconductor laser 1, reflectance and mounting dispersion of the reflection mirror 3, and mounting dispersion of the front monitor detector 7, there is generated dispersion in quantity of incident light upon the front monitor detector 7.

Influence of such dispersion in quantity of incident light to the front monitor detector 7 may be restrained in respective optical pickup apparatus by gain-adjusting the feedback control system with use of an external resistance. However, in the case of carrying out gain adjustment with use of an external resistance, a response speed of the feedback control system is influenced even if the output power of the semiconductor laser 1 is fallen within an appropriate range.

This influence becomes serious when write access to the optical disk 8 is performed, more specifically, when write access is performed to the optical disk 8 by a slim-type optical pickup apparatus (having narrow vertical width) such as one incorporated in a notebook computer.

SUMMARY OF THE INVENTION

Accordingly, it is an object of the present invention to provide a front monitor-type optical pickup apparatus capable of eliminating dispersion in quantity of incident light upon a front monitor detector attributed to component and assembly dispersion.

It is another object of the present invention to provide a manufacturing method of an optical pickup apparatus suitable for manufacturing such front monitor-type optical pickup apparatuses.

In order to achieve the above object, there is provided a front monitor-type optical pickup apparatus for emitting a laser light beam from a laser light source to an information recording medium and detecting quantity of the laser light beam by means of a front monitor detector so as to execute feedback control of output power from the laser light source, while reading information from the information recording medium and/or writing information onto the information recording medium with use of the laser light beam, comprising:

a window for taking in the laser light beam; and a housing facing the window for housing the front monitor detector, wherein in the housing, a position of the front monitor detector is adjustable.

It is noted that "in the housing" means that the front monitor detector is in the state of being completely housed in the housing.

According to the optical pickup apparatus of the present invention, the position of the front monitor detector is adjustable in the housing, i.e., against the laser light beam taken in through the window of the housing. Therefore, the position adjustment of the front monitor detector eliminates dispersion in quantity of incident light upon the front monitor detector attributed to component and assembly dispersion.

For example, in assembling the optical pickup apparatus, first the front monitor detector is inserted in the housing from the outside, and then mounted in such position that the detected quantity of laser light from the laser light source becomes higher than a designed medium value. Next, the front monitor detector is moved, for example, in direction opposed to the direction of insertion in the housing. This approximates the detected quantity of laser light from the laser light source to the designed medium value. In such a position, the front monitor detector is secured. As a result, dispersion in quantity of incident light upon the front monitor detector attributed to component and assembly dispersion can be eliminated. Furthermore, no influence is exerted to the response speed of the feedback control system.

In one embodiment of the present invention, an inner size of the housing is set larger than a size of the front monitor detector in at least one direction along a housing front face on which the window is present.

It is noted that in this specification, the front-rear direction of the housing is defined by incident direction of the laser light beam. More specifically, the laser light beam is to come from the forward to the backward direction of the housing.

According to the embodiment of the optical pickup apparatus, the inner size of the housing is set larger than the size of the front monitor detector in at least one direction along the housing front face on which the window is present. Therefore, in the housing, the position of the front monitor detector is adjusted in that direction.

In one embodiment of the present invention, the housing has a through hole at least on one wall face that is connected to a housing front face on which the window is present and that extends in longitudinal direction, and the front monitor detector is position-adjusted through the through hole from outside of the housing.

According to the embodiment of the optical pickup apparatus, the housing has the through hole at least on one wall face that is connected to the housing front face on which the window is present and that extends in longitudinal direction, and the front monitor detector is position-adjusted through the through hole from outside of the housing. Therefore, the position of the front monitor detector housed in the housing can be easily adjusted from the outside of the housing.

In one embodiment of the present invention, the through hole is a tapped hole.

According to the optical pickup apparatus of this embodiment, the through hole is a tapped hole. Therefore, inserting a screw in the tapped hole from the outside of the housing and turning it enables fine adjustment of the position of the front monitor detector easily with a screw tip.

In one embodiment of the present invention, an inner size of the housing is set larger than a size of the front monitor detector in longitudinal direction perpendicular to a housing front face on which the window is present, and in the housing, on a rear side of the front monitor detector, part of a flexible substrate incorporating the front monitor detector is inserted in the state of being bended so as to press the front monitor detector to the housing front wall.

According to the optical pickup apparatus of this embodiment, in the housing, on a rear side of the front monitor detector, part of a flexible substrate incorporating the front monitor detector is inserted in the state of being bended so as to press the front monitor detector to the housing front wall. Therefore, the position of the front monitor detector is determined in the front-rear direction of the housing.

In one embodiment of the present invention, an inner size of the housing is set larger than a size of the front monitor detector in longitudinal direction perpendicular to a housing front face on which the window is present, and in the housing, on a rear side of the front monitor detector, part of a flexible substrate incorporating the front monitor detector is inserted in the state of being bended so as to absorb sagging of the flexible substrate incorporating the front monitor detector.

According to the optical pickup apparatus of this embodiment, in the housing, on a rear side of the front monitor detector, part of the flexible substrate incorporating the front monitor detector is inserted in the state of being bended so as to absorb sagging of the flexible substrate. Therefore, sagging of the flexible substrate is absorbed, which facilitates disposition of remaining part of the flexible substrate.

In one embodiment of the present invention, part of the flexible substrate on a side anterior to the front monitor detector is inserted in the state of being bended to a rear side of the front monitor detector.

Herein, "part of the flexible substrate on a side anterior to the front monitor detector" refers to the part inserted first in the housing when the optical pickup apparatus is assembled.

According to the optical pickup apparatus of this embodiment, part of the flexible substrate on a side anterior to the front monitor detector (this is called "an anterior portion of the flexible substrate") is inserted in the state of being bended to a rear side of the front monitor detector. Therefore, by the anterior portion of the flexible substrate, the front monitor detector is pressed to the housing front wall. As a result, the position of the front monitor detector is determined in the front-rear direction of the housing.

In one embodiment of the present invention, the flexible substrate has a left wing portion and a right wing portion each stretched to a left side and a right side of the front monitor detector with regard to a direction of inserting the flexible substrate in the housing, and each of the left wing portion and the right wing portion of the flexible substrate are inserted in the state of being bended to a rear side of the front monitor detector.

According to the optical pickup apparatus of this embodiment, each of the left wing portion and the right wing portion of the flexible substrate are inserted in the state of being bended to a rear side of the front monitor detector. Therefore, by the left wing portion and the right wing portion of the flexible substrate, the front monitor detector is pressed to the housing front wall. As a result, the position of the front monitor detector is determined in the front-rear direction of the housing.

In one embodiment of the present invention, both the left wing portion and the right wing portion of the flexible substrate are in contact with a rear wall and a lateral wall of the housing.

According to the optical pickup apparatus of this embodiment, both the left wing portion and the right wing portion of the flexible substrate are in contact with a rear wall as well as a lateral wall of the housing. Therefore, the front monitor detector is pressed to the housing front wall and the position thereof is determined in the front-rear direction. In addition, by the reaction force which the left wing portion and the right wing portion of the flexible substrate receive from the left and right lateral walls, the position of the front monitor detector in terms of the horizontal direction is determined.

In one embodiment of the present invention, the flexible substrate incorporating the front monitor detector is provided with a catch portion to be engaged from the outside of the housing.

According to the optical pickup apparatus of this embodiment, the flexible substrate incorporating the front monitor detector is provided with the catch portion to be engaged from the outside of the housing. Therefore, when the optical pickup apparatus is assembled, after the front monitor detector is housed in the housing, an engagement member is engaged with the catch portion on the flexible substrate from the outside of the housing, which enables position adjustment of the front monitor detector. More specifically, the position of the front monitor detector housed in the housing can be easily adjusted from the outside of the housing.

In one embodiment of the present invention, the catch portion of the flexible substrate is reinforced with a material harder than a material of the flexible substrate.

It is noted that "reinforced" herein includes the state of being reinforced by bonding of a hard substrate to the catch portion of the flexible substrate.

According to the optical pickup apparatus of this embodiment, the catch portion of the flexible substrate is reinforced with the material harder than the material of the flexible substrate. Therefore, it is possible to prevent the vicinity of the catch portion of the flexible substrate from being damaged when the engagement member is engaged with the catch portion of the flexible substrate from the outside of the housing, and position adjustment of the front monitor detector is conducted. Therefore, it becomes possible to achieve smooth position adjustment of the front monitor detector.

Also, there is provided a manufacturing method of an optical pickup apparatus, comprising the step of:

forming a catch portion on a flexible substrate of the optical pickup apparatus so as to protrude to outside of a housing;

engaging an engagement member with the catch portion from outside of the housing, and moving the flexible substrate together with the front monitor detector in the housing for adjusting a position of the front monitor detector against the laser light beam; and then cutting away and removing the catch portion extending to outside of the housing.

According to the manufacturing method of the optical pickup apparatus in the present invention, after the front monitor detector is housed in the housing, the engagement member is engaged with the catch portion of the flexible substrate from the outside of the housing, which enables position adjustment of the front monitor detector. Therefore, the position of the front monitor detector housed in the housing can be easily adjusted from the outside of the housing. In addition, after the position of the front monitor detector against the laser light beam is adjusted, the catch portion protruding to the outside of the housing is cut away and removed, and so the catch portion will not remain in the state of protruding to the outside of the housing after assembling. This makes it possible to manufacture the optical pickup apparatus compact.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5A is a view showing a flexible substrate incorporating a front monitor detector for use in an optical pickup apparatus of a fourth embodiment of the present invention, while

FIGS. 8A and 8B are views showing a front monitor detector and a housing that housed the front monitor detector in an optical pickup apparatus of a seventh embodiment of the present invention, while FIG. 9A is a view showing a modified example of the flexible substrate shown in FIG. 8C, while

DETAILED DESCRIPTION OF THE PREFERRED EMBODIMENTS

Hereinbelow, the optical pickup apparatus of the present invention will be described in detail in conjunction with the embodiments with reference to accompanying drawings.

The optical pickup apparatus described hereinafter is of a front monitor type having a basic configuration shown in FIG. 1, which is composed of a diffraction grating 2, a reflection mirror 3, a beam splitter 4, a collimate lens 5 and an object lens 6 disposed along a route of a laser light beam emitted by a semiconductor laser 1 toward an information recording medium (optical disk) 8, and also provided with a front monitor detector 7. The laser light beam emitted from the semiconductor laser 1 is radiated to the optical disk 8 through the diffraction grating 2, the beam splitter 4, the collimate lens 5 and the object lens 6. With use of the laser light beam, information is read from the optical disk 8 and written onto the optical disk 8. At the same time, part of the laser light beam is reflected by the reflection mirror 3 and comes into the front monitor detector 7, and the front monitor detector 7 detects quantity of the incident light beam. Then, an unshown feedback control system executes feedback control of the driving current supplied to the semiconductor laser 1 so as to keep the output level from the front monitor detector 7 constant, thereby keeping the output power from the semiconductor laser 1 at a constant rate. It is noted that FIG. 1 is a view showing a fundamental relation between component members of the optical pickup apparatus, and is not a view showing a spatial arrangement of actual component members.

First Embodiment

Figure 2A:
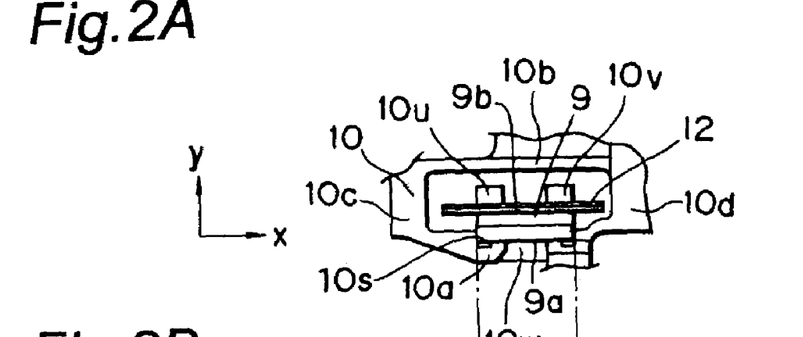
FIGS. 2A and 2B are views showing a front monitor detector and a housing that housed the front monitor detector in an optical pickup apparatus of a first embodiment of the present invention.
Figure 2B:
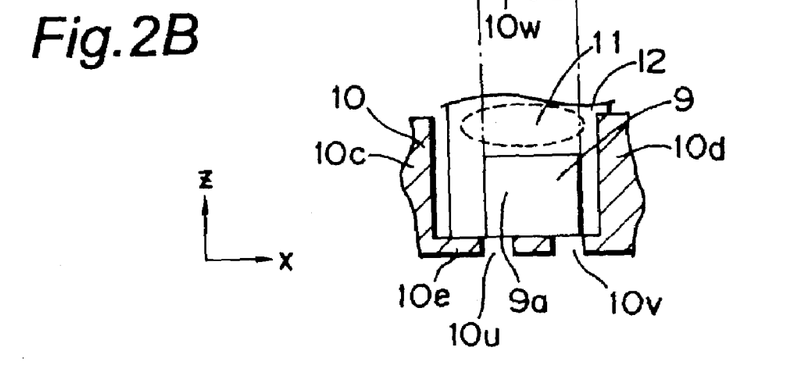

FIGS. 2A and 2B are views showing a specific configuration of a front monitor detector 9 and a housing 10 that housed the front monitor detector 9 in the front monitor-type optical pickup apparatus with the present invention applied thereto. FIG. 2A is a view seen from the top, while FIG. 2B is a cross sectional view seen from the front with the front wall of the housing 10 being omitted. It is noted that for easy understanding, there is shown in the drawing, a the rectangular coordinates system where the lateral direction is expressed as x axis, the longitudinal direction as y axis, and the vertical direction as z axis (similar in FIGS. 3 to 9).

The front monitor detector 9 has the external shape of an approximate rectangular parallelopiped. A front face 9a of the front monitor detector 9 serves as a light receiving face for receiving a laser light beam. A rear face 9b of the front monitor detector 9 is bonded to a flexible substrate 12. An output from the front monitor detector 9 is sent to the feedback control system through an unshown interconnection line provided on the flexible substrate 12 extending like a strip. The flexible substrate 12 is made from a material having flexibility such as polyimide resin. It is noted that in this example, the front monitor detector 9 is mounted on the top portion of the flexible substrate 12.

The housing 10 is composed of a front wall 10a forming the front face of the housing, an rear wall 10b forming the rear face, a left-side wall 10c, a right-side wall 10d, and a bottom wall 10e forming the bottom face, and the upper part of the housing 10 is opened. On the housing front wall 10a, there is formed a cavity 10s having a recessed cross section extending in vertical direction. The width of the cavity 10s in lateral direction substantially coincides with the size of the front monitor detector 9 in lateral direction. Therefore, the step of the cavity 10s restrains lateral movement of the front monitor detector 9. However, since the cavity 10s extends in vertical direction, the cavity 10s will not restrain vertical movement of the front monitor detector 9. In a portion of the housing front wall 10a corresponding to the center of the cavity 10s, there is formed a window 10w for taking a laser light beam in the housing from the outside of the housing 10. The window 10w extends in vertical direction along the cavity 10s.

The housing rear wall 10b, the left-side wall 10c, and the right-side wall 10d are each formed to be planar. The inner size of the housing 10 is set slightly larger than the size of the top portion of the flexible substrate 12 incorporating the front monitor detector 9 with regard to lateral direction and longitudinal direction. This is for providing some clearance around the flexible substrate 12 when the front monitor detector 9 is inserted in the housing 10 from the upper side together with the flexible substrate 12. Further, the inner size of the housing 10 is larger than the size of the front monitor detector 9 with regard to the vertical direction, and in this example, it is set to be around 1.5 times larger. This is for enabling adjustment of the vertical position of the front monitor detector 9.

The housing bottom wall 10e is formed to be approximately planar, though in a portion corresponding to right under the front monitor detector 9, there are formed square holes 10u, 10v serving as through holes whose sizes are smaller than the size of the front monitor detector 9.

On occasion of assembling the optical pickup apparatus, first, the front monitor detector 9 is inserted in the housing 10 from the upper side together with the flexible substrate 12. Then, the front monitor detector 9 is fitted into the cavity 10s on the housing front wall 10a and brought into contact with the housing bottom wall 10e. In this example, the front monitor detector 9 is mounted in such position that the quantity of laser light detected by the front monitor detector 9 becomes higher than a designed medium value (a medium value in an appropriate range). Herein, above the front monitor detector 9, there is generated a space 11 for position adjustment. Next, the front monitor detector 9 is moved upward from the lower side of the housing 10 by inserting, for example, a rod member through the square holes 10u, 10v in the housing bottom wall 10e. This approximates the detected quantity of laser light to the designed medium value.

More specifically, when component dispersion and assembly dispersion are small and so the quantity of laser light detected by the front monitor detector 9 is sufficiently larger than the designed medium value, the front monitor detector 9 is moved upward on a relatively large scale. Contrary to this, when component dispersion and assembly dispersion are large, the quantity of laser light detected by the front monitor detector 9 becomes also slightly larger than the designed medium value. In this case, therefore, the front monitor detector 9 is moved upward on a relatively small scale. In either case, the quantity of laser light detected by the front monitor detector 9 becomes approximate to the designed medium value.

In the position where the detected quantity of laser light approximates the designed medium value, the front monitor detector 9 is stopped and secured.

As a result, dispersion in quantity of incident light on the front monitor detector 9 attributed to component and assembly dispersion may be eliminated. Furthermore, no influence is exerted to the response speed of the feedback control system. Also, since the square holes 10u, 10v are formed in the housing bottom wall 10e, the position of the front monitor detector 9 housed in the housing 10 can be easily adjusted from the outside of the housing 10.

Second Embodiment

Figure 3:
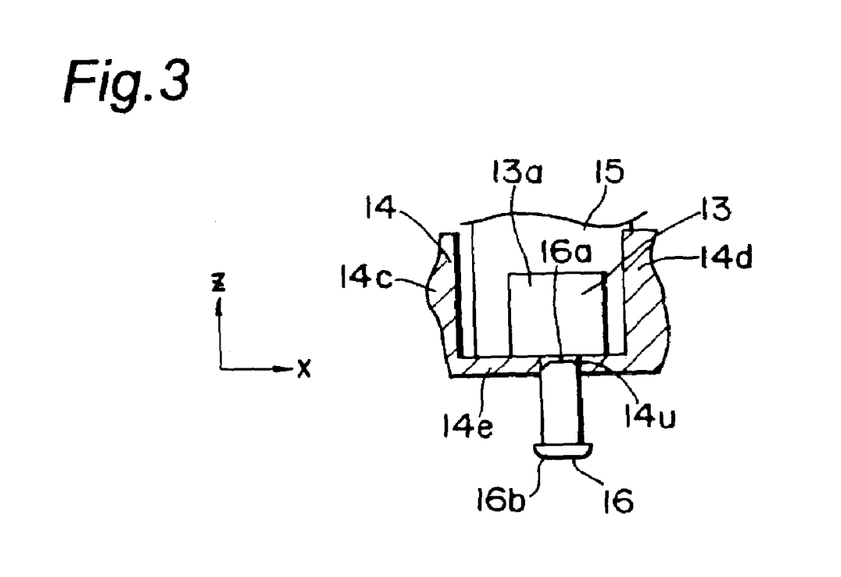
FIG. 3 is a view showing a front monitor detector and a housing that housed the front monitor detector in an optical pickup apparatus of a second embodiment of the present invention.

FIG. 3 is a view showing a specific configuration of another front monitor detector 13 and a housing 14 that housed the front monitor detector 13 in the front monitor-type optical pickup apparatus with the present invention applied thereto. FIG. 3 is a cross sectional view seen from the front side with the front wall of the housing 14 being omitted similar to FIG. 2B.

In this example, a front monitor detector 13 and a flexible substrate 15 incorporating the front monitor detector 13 have configurations each identical to the above-mentioned front monitor detector 9 and the flexible substrate 12. Similar to the aforesaid front face 9a of the front monitor detector 9, a front face 13a of the front monitor detector 13 serves as a light receiving face.

Instead of the aforesaid square holes 10u, 10v, a tapped hole 14u is formed on the bottom wall 14e of the housing 14 as a through hole. Other elements of the housing 14 are of structure identical to that of the above-mentioned housing 10.

In the case of using a tapped hole 14u as a through hole like this example, a screw 16 is fitted into the tapped hole 14u from the lower side of the housing 14, and the head portion 16b is turned by means of an unshown driver, which makes it possible to move the screw 16 gradually in vertical direction. Therefore, the tip of the screw 16 enables easy fine adjustment of the position of the front monitor detector 13. As a result, in a position where the detected quantity of laser light approximates to the designed medium value, the front monitor detector 13 can be easily secured. Furthermore, the screw 16, if being kept screwed, may restrain downward movement of the front monitor detector 13, thereby making it possible to easily secure the front monitor detector 13.

Third Embodiment

Figure 4A:
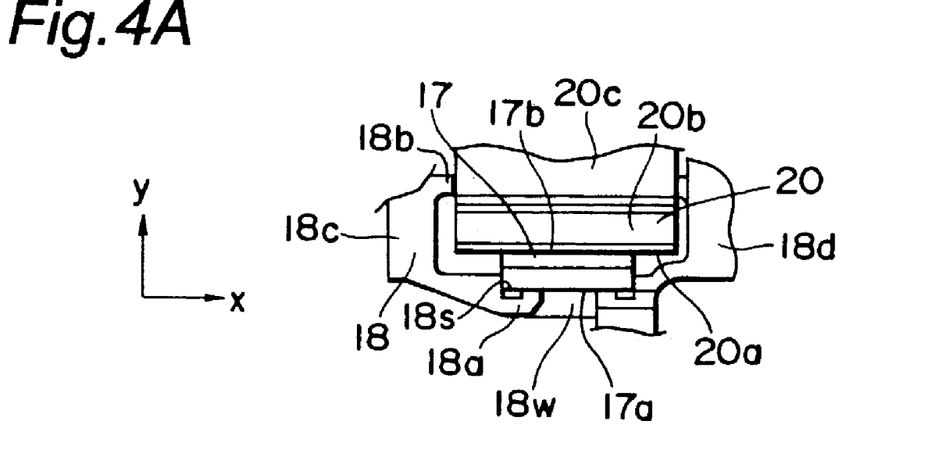
FIGS. 4A and 4B are views showing a front monitor detector and a housing that housed the front monitor detector in an optical pickup apparatus of a third embodiment of the present invention.
Figure 4B:
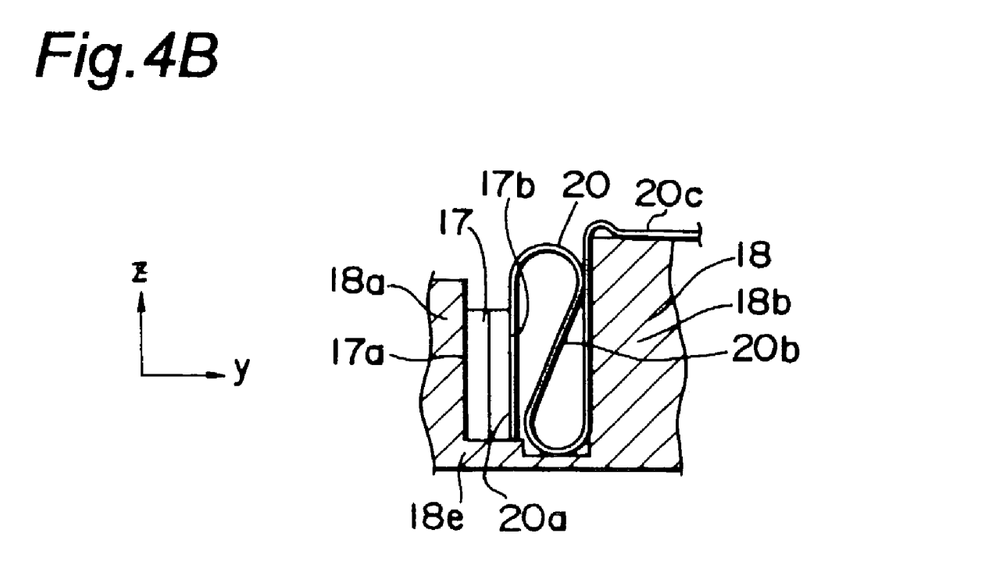

FIGS. 4A and 4B are views showing a specific configuration of another front monitor detector 17 and a housing 18 that housed the front monitor detector 17 in the front monitor-type optical pickup apparatus with the present invention applied thereto. FIG. 4A is a view seen from the top, while FIG. 4B is a cross sectional view seen from the right side with the right-side wall of the housing 18 being omitted.

In this example, a front monitor detector 17 and a flexible substrate 20 incorporating the front monitor detector 17 have configurations each identical to the above-mentioned front monitor detector 9 and the flexible substrate 12. Similar to the aforesaid front face 9a of the front monitor detector 9, a front face 17a of the front monitor detector 17 serves as a light receiving face. A rear-face 17b of the front monitor detector 17 is bonded to a top portion 20a of the flexible substrate 20. Particularly in the FIGS. 4A and 4B, there are shown strip-like portions 20b, 20c that are connected to the top portion 20a of the flexible substrate 20 and extend to the aforesaid feedback control system.

The inner size of the housing 18 is set slightly larger than the above-mentioned inner size of the housing 10 in the longitudinal direction. Other elements of the housing 18 are of structure identical to that of the aforesaid housing 10. In the drawing, there are shown a front wall 18a, a rear wall 18b, a left-side wall 18c, a right-side wall 18d, a bottom wall 18e, a cavity 18s, and a window 18w. It is noted that on the bottom wall 18e of the housing 18, there is present a square hole for enabling adjustment of the vertical position of the front monitor detector 17, which is not shown for simplifying the drawing.

In this example, in the housing 18, on the rear side of the front monitor detector 17, a strip-shaped portion 20b extending from the top portion 20a of the flexible substrate 20 to the feedback control system is inserted in the state of being bended. Since the flexible substrate 20 has flexibility, it tends to return to the original expanded state, and so the strip-shaped portion 20b receives reaction-force from the housing rear wall 10b. By this reaction force, the front monitor detector 17 is pressed to the housing front wall 18a, which determines the position of the front monitor detector 17 in the lateral direction inside the housing 18. In addition to this, sagging of the flexible substrate 20 is absorbed, which facilitates disposition of a remaining part 20c of the flexible substrate 20.

Fourth Embodiment

Figure 5A:
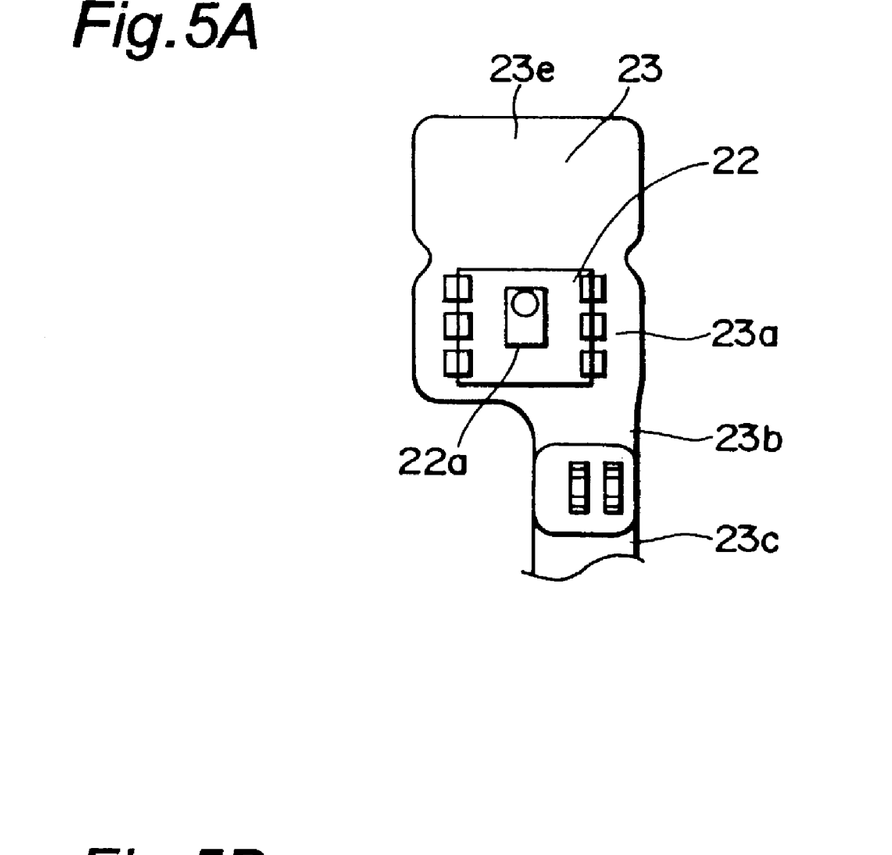
Figure 5B:
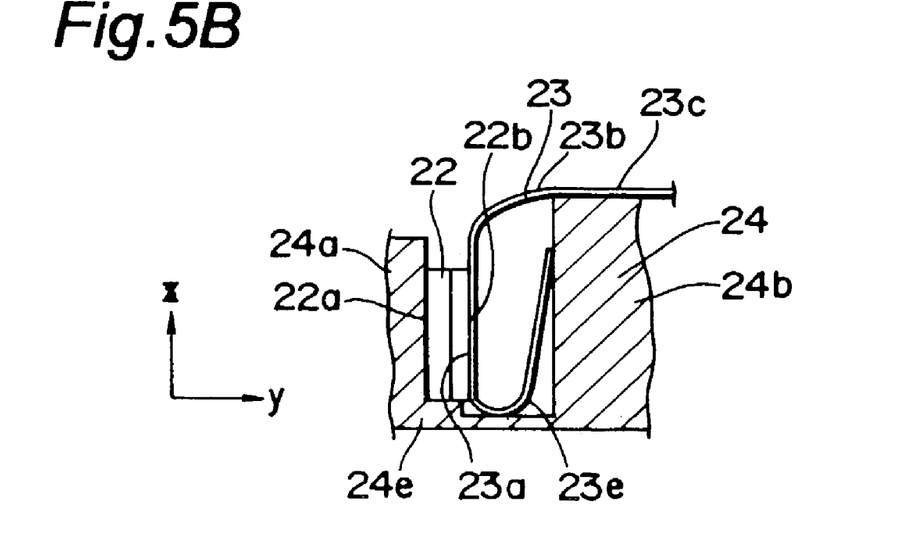
FIG. 5B is a view showing the front monitor detector and a housing that housed the front monitor detector in the optical pickup apparatus of the fourth embodiment of the present invention.

FIG. 5B is a view showing a specific configuration of another front monitor detector 22 and a housing 24 that housed the front monitor detector 22 in the front monitor-type optical pickup apparatus with the present invention applied thereto. It is noted that FIG. 5B is a cross sectional view seen from the right side with the right-side wall of the housing 24 being omitted.

In this example, a front monitor detector 22 has configuration identical to the above-mentioned front monitor detector 9. Similar to the aforesaid front face 9a of the front monitor detector 9, a front face 22a of the front monitor detector 22 serves as a light receiving face. A rear face 22b of the front monitor detector 22 is bonded to the flexible substrate 23.

As shown in FIG. 5A, on the side anterior to a portion (mounting portion) 23a on which the front monitor detector 22 is mounted, a flexible substrate 23 has a top portion 23e having a width substantially identical to the width of the mounting portion 23a. An output from the front monitor detector 22 is sent to the aforesaid feedback control system through an unshown interconnection line provided on the strip-shaped portions 23b, 23c extending from the mounting portion 23a of the flexible substrate 23 to the feedback control system. In this example, the width of the strip-shaped portions 23b, 23c is set to be approximately one half of the width of the mounting portion 23a. The flexible substrate 23 is made from a material having flexibility such as polyimide resin.

As shown in FIG. 5B, the housing 24 is of structure completely identical to the housing 18 shown in FIG. 4. More specifically, the inner size of the housing 24 is set slightly larger than the before-mentioned inner size of the housing 10 in the longitudinal direction. In the drawing, there are shown a front wall 24a, a rear wall 24b, and a bottom wall 24e. It is noted that on the bottom wall 24e of the housing 24, there is present a square hole for enabling adjustment of the vertical position of the front monitor detector 22, which is not shown for simplifying the drawing.

In this example, in the housing 24, on the rear side of the front monitor detector 22, a top portion 23e of the flexible substrate 23 is inserted in the state of being bended. Since the flexible substrate 23 has flexibility, it tends to return to the original expanded state, and so the top portion 23e receives reaction force from the housing rear wall 24b. By this reaction force, the front monitor detector 22 is pressed to the housing front wall 24a, which determines the position of the front monitor detector 22 in the longitudinal direction inside the housing 24.

It is noted that the strip-shaped portion 23b of the flexible substrate 23 may be inserted on the rear side of the front monitor detector 22 in the housing 24, more specifically inserted between the top portion 23e and the mounting portion 23a in the state being bended. Consequently, sagging of the flexible substrate 23 is absorbed, which facilitates disposition of a remaining part 23c of the flexible substrate 23.

Fifth Embodiment

Figure 6:
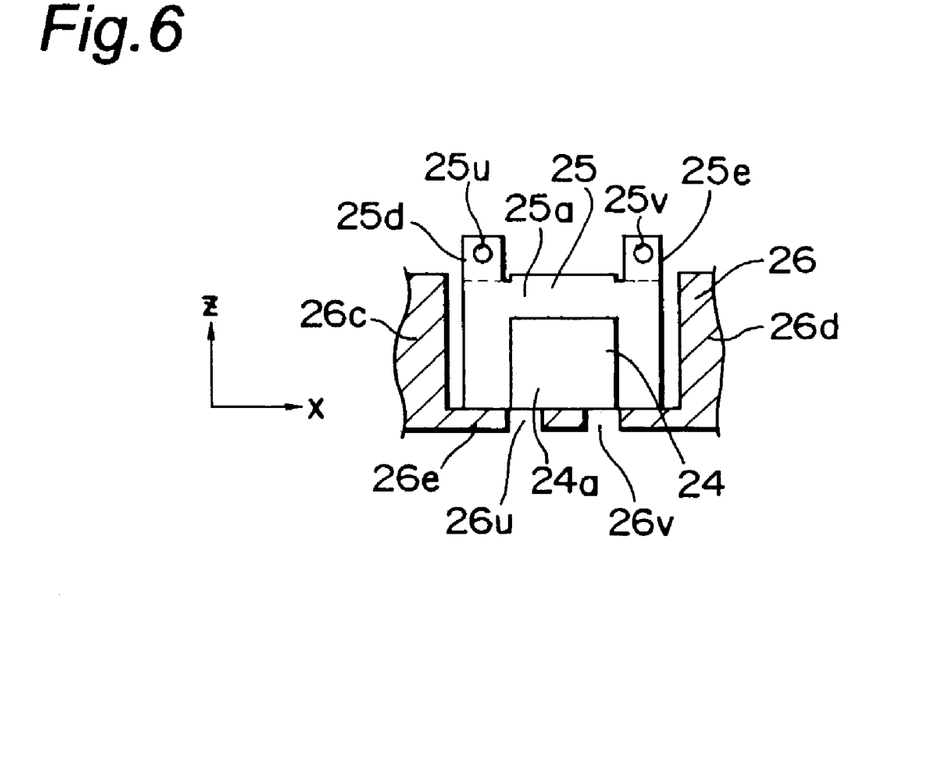
FIG. 6 is a view showing an optical pickup apparatus in a fifth embodiment of the present invention under the manufacturing process.

FIG. 6 is a view showing a front monitor-type optical pickup apparatus with the present invention applied thereto under the manufacturing process. The optical pickup apparatus is composed of another front monitor detector 24 and a housing 26 that housed the front monitor detector 24. FIG. 6 is a cross sectional view seen from the front with the front wall of the housing 26 being omitted similar to FIG. 2B.

In this example, a front monitor detector 24 has configuration completely identical to the before-mentioned front monitor detector 9. Similar to the aforesaid front face 9a of the front monitor detector 9, a front face 24a of the front monitor detector 24 serves as a light receiving face.

On the front wall of the housing 26, there is not formed a cavity 10s having a recessed cross section extending in vertical direction as in the above-mentioned housing 10. Therefore, there is not provided any element for restraining lateral movement of the front monitor detector 24. Other elements of the housing 26 are of structure identical to that of the aforesaid housing 10. In the drawing, there are shown a left-side wall 26c, a right-side wall 26d, a bottom wall 26e, and square holes 26u, 26v.

In this example, the front monitor detector 24 is mounted on a top portion 25a of a flexible substrate 25. There are provided rectangular castoff portions 25d, 25e connected to the upper left corner and upper right corner (in FIG. 6) of the top portion 25a of the flexible substrate 25 in the state of protruding outside of the housing 26. The size of the castoff portions 25d, 25e are set not to exceed the lateral width of the top portion 25a of the flexible substrate 25. These castoff portions 25d, 25e are each formed to have round holes 25u, 25v going therethrough as hook portions to be engaged from the outside of the housing 26. Although omitted in the drawing, an aforesaid strip portion (unshown) extends to the feedback control system from a region between the castoff portions 25d and 25e of the top portion 25a.

On occasion of assembling the optical pickup apparatus, after the front monitor detector 24 is housed in the housing 26 together with the top portion 25a of the flexible substrate 25, an engagement member is engaged with the round holes 25u, 25v of the castoff portions 25d, 25e from the outside of the housing 26, which enables position adjustment of the front monitor detector 24. More specifically, the position of the front monitor detector 24 housed in the housing 26 can be easily adjusted in vertical and lateral direction in this example from the outside of the housing 26.

Sixth Embodiment

Figure 7:
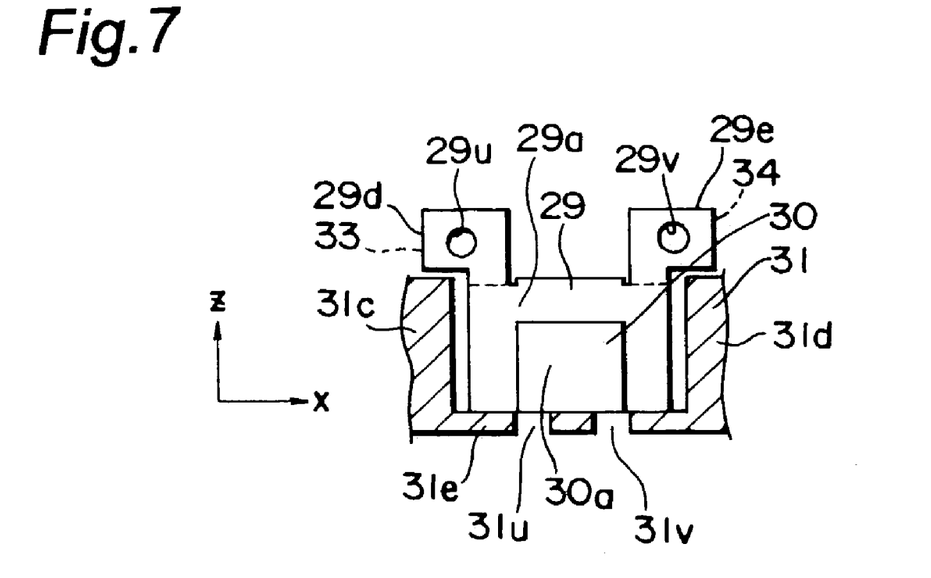
FIG. 7 is a view showing an optical pickup apparatus in a sixth embodiment of the present invention under the manufacturing process.

FIG. 7 is a view showing a front monitor-type optical pickup apparatus with the present invention applied thereto under the manufacturing process. The optical pickup apparatus is composed of another front monitor detector 30 and a housing 31 that housed the front monitor detector 30. FIG. 7 is a cross sectional view seen from the front with the front wall of the housing 31 being omitted similar to FIG. 2B.

In this example, the front monitor detector 30 has configuration completely identical to the before-mentioned front monitor detector 9. Similar to the aforesaid front face 9a of the front monitor detector 9, a front face 30a of the front monitor detector 30 serves as a light receiving face.

On the front wall of the housing 31, there is not formed a cavity 10s having a recessed cross section extending in vertical direction as in the above-mentioned housing 10. Therefore, there is not provided any element for restraining lateral movement of the front monitor detector 30. Other elements of the housing 31 are of structure identical to that of the aforesaid housing 10. In the drawing, there are shown a left-side wall 31c, a right-side wall 31d, a bottom wall 31e, and square holes 31u, 31v.

In this example, the front monitor detector 30 is mounted on a top portion 29a of a flexible substrate 29. There are provided rectangular castoff portions 29d, 29e connected to the upper left corner and upper right corner (in FIG. 7) of the top portion 29a of the flexible substrate 29 in the state of protruding outside of the housing 26. The size of the castoff portions 29d, 29e are set larger than the above-mentioned castoff portions 25d, 25e so as to exceed the lateral width of the top portion 29a of the flexible substrate 29. To these castoff portions 29d, 29e, there are bonded hard substrates 33, 34 made from materials harder than the material of the flexible substrate 29. More specifically, the castoff portions 29d, 29e are backed and reinforced with the hard substrates 33, 34. These castoff portions 29d, 29e and the hard substrates 33, 34 are each formed to have round holes 29u, 29v going therethrough as hook portions to be engaged from the outside of the housing 31. Although omitted in the drawing, an aforesaid strip portion (unshown) extends to the feedback control system from a region between the castoff portions 29d and 29e of the top portion 29a.

On occasion of assembling the optical pickup apparatus, after the front monitor detector 30 is housed in the housing 31 together with the top portion 29a of the flexible substrate 29, an engagement member is engaged with the round holes 29u, 29v of the castoff portions 29d, 29e from the outside of the housing 31, which enables position adjustment of the front monitor detector 30. More specifically, the position of the front monitor detector 30 housed in the housing 31 can be easily adjusted in vertical and lateral direction in this example from the outside of the housing 31. In addition, since the castoff portions 29d, 29e are reinforced with the hard substrates 33, 34, it becomes possible to prevent breakage of the vicinity of the round holes 29u, 29v of the flexible substrate 29 in performing position adjustment of the front monitor detector 30. This achieves smooth position adjustment of the front monitor detector 30.

Further in this example, after the position of the front monitor detector 30 is adjusted, the castoff portions 29d, 29e protruding outside of the housing 31 are cut away and removed. Therefore, the castoff portions 29d, 29e will not remain in the state of protruding outside of the housing 31 after assembling. This makes it possible to manufacture the optical pickup apparatus compact.

Seventh Embodiment

Figure 8A:
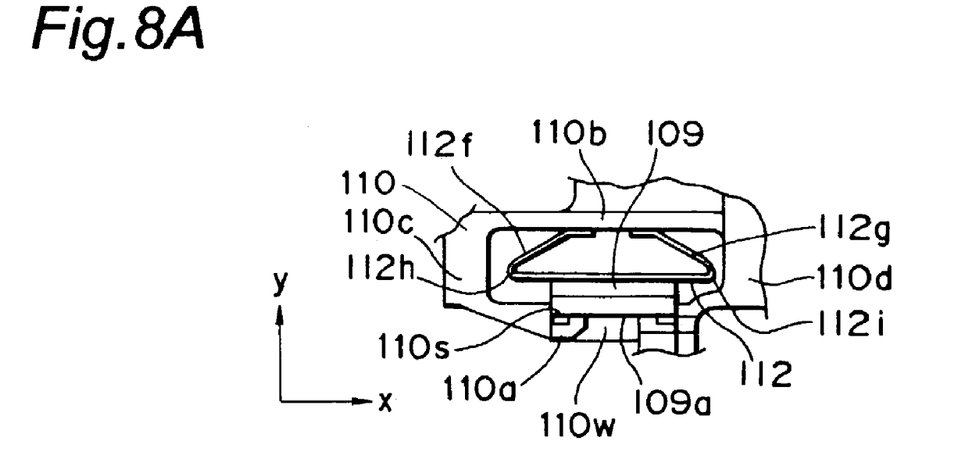
Figure 8B:
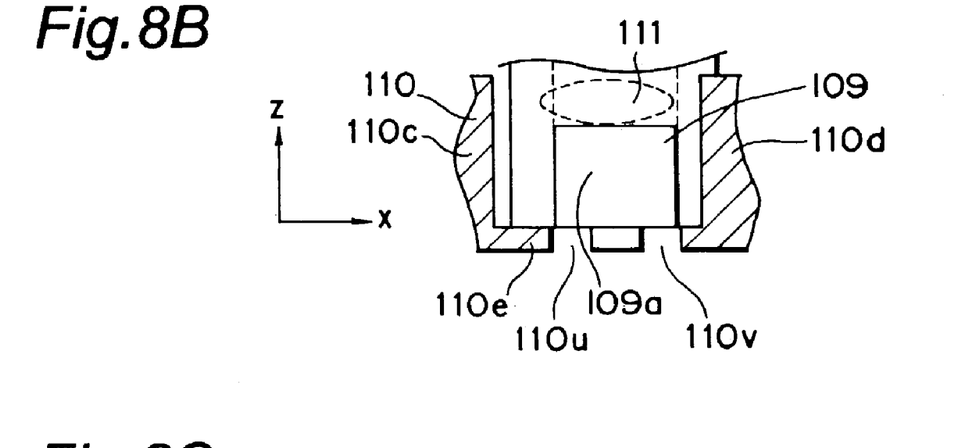

FIGS. 8A and 8B are views showing a specific configuration of a front monitor detector 109 and a housing 110 that housed the front monitor detector 109 in the front monitor-type optical pickup apparatus with the present invention applied thereto. FIG. 8A is a view seen from the top, FIG. 8B is a cross sectional view seen from the front with the front wall of the housing 110 being omitted, and FIG. 8C is a view showing the front monitor detector 109 and a flexible substrate 112 incorporating the front monitor detector 109 before being inserted in the housing 110 in an expanded state.

In this example, the front monitor detector 109 has configuration identical to that of the above-mentioned front monitor detector 9. Similar to the aforesaid front face 9a of the front monitor detector 9, a front face 109a of the front monitor detector 109 serves as a light receiving face. A rear face of the front monitor detector 109 is bonded to the flexible substrate 112.

Figure 8C:
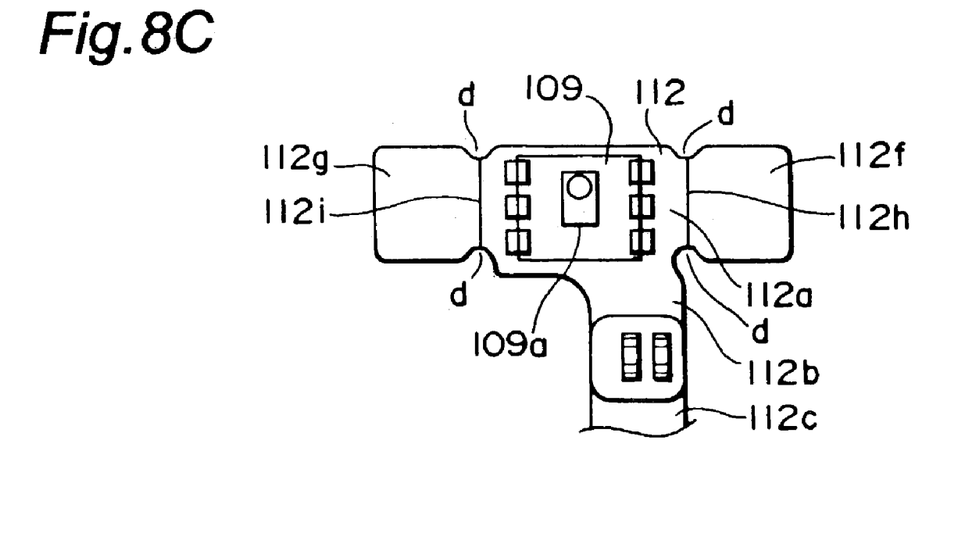
FIG. 8C is a view showing a flexible substrate incorporating the front monitor detector for use in the optical pickup apparatus.

As shown in FIG. 8C, the flexible substrate 112 has approximately rectangular left wing portion 112f and right wing portion 112g connected to a portion (mounting portion) 112a on which the front monitor detector 109 is mounted, which respectively stretch to a left side and a right side of the front monitor detector 109 (it is noted that the left side and the light side are defined by the front monitor detector 109 being inserted in the housing 110 shown in FIG. 8A). The size of the left wing portion 112f and the right wing portion 112g is set equal to the size of the front monitor detector 109. In the boundaries between the mounting portion 112a and the left wing portion 112f, and between the mounting portion 112a and the right wing portion 112g, there are formed bending lines 112h, 112i each composed of a vertically-extending groove having a recessed cross section. Therefore, the flexible substrate 112 may be easily and surely bended at the portions corresponding to the bending lines 112h, 112i. Also, the portions corresponding to the bending lines 112h, 112i are provided with upper and lower notches d, and so the vertical size of the portions is smaller than that of other portions. This makes bending easier. An output from the front monitor detector 109 is sent to the aforesaid feedback control system through an unshown interconnection line provided on the strip-shaped portions 112b, 112c extending from the mounting portion 112a of the flexible substrate 112 to the feedback control system. In this example, the width of the strip-shaped portions 112b, 112c is set to be approximately one half of the width of the mounting portion 112a. The flexible substrate 112 is made from a material having flexibility such as polyimide resin.

As shown in FIG. 8A, the housing 110 is of structure completely identical to that of the housings 18, 24 shown in FIGS. 4 and 5. More specifically, the inner size of the housing 110 is set slightly larger than the before-mentioned inner size of the housing 10 in the longitudinal direction. Other elements of the housing 18 are of structure identical to that of the aforesaid housing 10. In the drawing, there are shown a front wall 110a, a rear wall 110b, a left-side wall 110c, a right-side wall 110d, a bottom wall 110e, a cavity 110s, and a window 110w. Although omitted in FIG. 8A, square holes 110u, 110v for enabling adjustment of the vertical position of the front monitor detector 109 are present on the bottom wall 110e of the housing 110 as shown in FIG. 8B. Also, above the front monitor detector 109, there is provided a space 111 for position adjustment.

On the occasion of assembling the optical pickup apparatus, the flexible substrate 112 is inserted in the housing 110 with the left wing portion 112f and the right wing portion 112g being bended to the rear side of the front monitor detector 109. The left wing portion 112f and the right wing portion 112g of the inserted flexible substrate 112 tend to return to the original expanded state since the flexible substrate 112 has flexibility. The left wing portion 112f and the right wing portion 112g come into contact with the housing rear wall 110b and receive reaction force from the housing rear wall 110b. By this reaction force, the front monitor detector 109 is pressed to the housing front wall 110a. As a result, the position of the front monitor detector 109 is determined in the longitudinal direction within the housing.

Figure 9A:
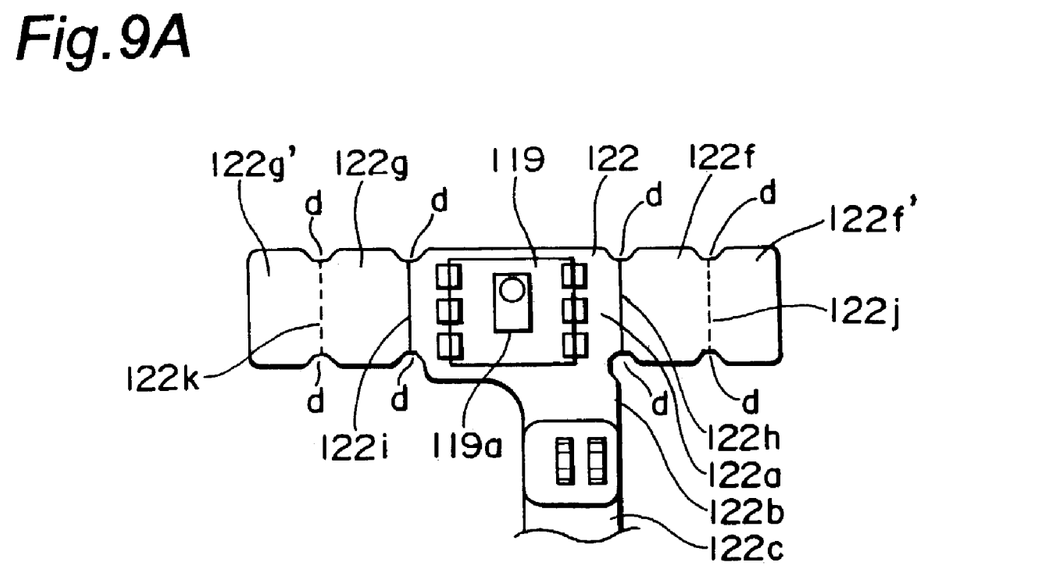

FIG. 9A is a view showing a modified example of a flexible substrate 122 shown in FIG. 8C. In this example, a front monitor detector 119 similar to the front monitor detector 109 is mounted on the flexible substrate 122.

The flexible substrate 122 has approximately rectangular left wing portions 122f, 122f' and right wing portions 122g, 122g' connected to a portion (mounting portion) 122a on which the front monitor detector 119 is mounted, which stretch to a left side and a right side of the front monitor detector 119 (it is noted that the left side and the light side are defined by the later-described state shown in FIG. 9B). The size of the left wing portions 122f, 122f' and the right wing portions 122g, 122g' is set equal to the size of the mounting portion 122a. In the boundaries between the mounting portion 122a and the left wing portion 122f, and between the mounting portion 122a and the right wing portion 122g, there are formed bending lines 122h, 122i each composed of a vertically-extending groove having a recessed cross section. Also, in an approximate center of the left wing portions 122f and 122f' (in a boundary between the root portion 122f and the edge portion 122f'), there is formed a second bending line 122j composed of a vertically-extending perforated line. Similarly, in an approximate center of the right wing portions 122g and 122g' (in a boundary between the root portion 122g and the edge portion 122g'), there is formed a second bending line 122k composed of a vertically-extending perforated line. Therefore, the flexible substrate 122 can be easily and surely bended at the portions corresponding to the bending lines 122h, 122i, 122j, 122k. The portions corresponding to the bending lines 122h, 122i, 122j, 122k are provided with upper and lower notches d, and so the vertical size of these portions is smaller than that of other portions. This makes bending easier. An output from the front monitor detector 119 is sent to the aforesaid feedback control system through an unshown interconnection line provided on the strip-shaped portions 122b, 122c extending from the mounting portion 122a of the flexible substrate 122 to the feedback control system. In this example, the width of the strip-shaped portions 122b, 122c is set to be approximately one half of the width of the mounting portion 122a. The flexible substrate 122 is made from a material having flexibility such as polyimide resin.

Figure 9B:
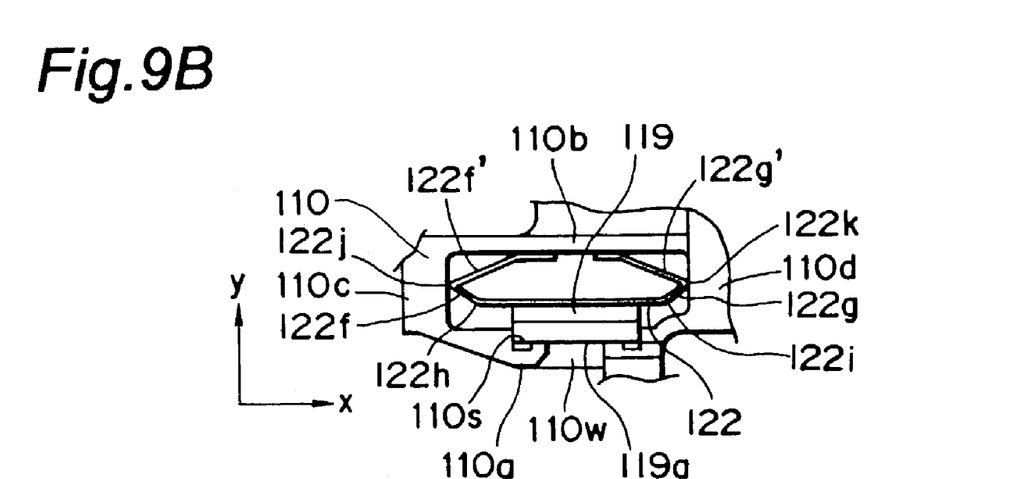
FIG. 9B is a view showing an optical pickup apparatus equipped with the flexible substrate.

On the occasion of assembling the optical pickup apparatus, as shown in FIG. 9B, the left wing portions 122f, 122f' of the flexible substrate 122 are bended to the rear side of the front monitor detector 119 by two steps with two bending lines 122h, 122i, while the right wing portions 122g, 122g' are bended to the rear side of the front monitor detector 119 by two steps with two bending lines 122j, 122k. In thus-bended state, the flexible substrate 122 is inserted in the housing 110. The left wing portions 122f, 122f' and the right wing portions 122g, 122g' of the inserted flexible substrate 122 tend to return to the original expanded state since the flexible substrate 122 has flexibility. In this example, the edge portion 122f' of the left wing portion and the edge portion 122g' of the right wing portion come into contact with the housing rear wall 110b and receive reaction force from the housing rear wall 110b. By this reaction force, the front monitor detector 119 is pressed to the housing front wall 110a. As a result, the position of the front monitor detector 119 is determined in the longitudinal direction within the housing 110. In addition, the second bending line 122j of the left wing portion, and the second bending line 122k of the right wing portion come into contact with the housing left-side wall 110c and the housing right-side wall 110d, respectively, and receive reaction force from the housing left-side wall 110c and the housing right-side wall 110d. By this reaction force, the position of the front monitor detector 119 is determined in the lateral direction within the housing 110. It is noted that the position of the front monitor detector 119 in the lateral direction within the housing 110, which is restrained by the cavity 110s on the housing having a recessed cross section, is further restrained by the reaction force, which ensures execution of restrain with higher accuracy.

It is understood that the present invention is preferably applied not only to a slim-type optical pickup apparatus (having narrow vertical width) such as one incorporated in a notebook computer, but also to a half-height-type optical pickup apparatus for use in a stationary-type drive and a built-in drive of desktop computer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front monitor-type optical pickup apparatus for emitting a laser light beam from a laser light source to an information recording medium and detecting a quantity of the emitted laser light beam comprising:

a front monitor detector for executing feedback control of output power from the laser light source based on the detected quantity of the laser light beam while reading information from the information recording medium and/or writing information onto the information recording medium with use of the laser light beam, comprising:

a housing which houses the front monitor detector;

a window which is formed on a wall of the housing for taking in the laser light beam from the laser light source on an outside of the housing; and a flexible substrate which is housed in the housing and on which the front monitor detector is mounted with its rear surface fixed directly thereto, wherein, in the housing, a position of the front monitor detector is adjustable via the flexible substrate, an inner size of the housing is set larger than a size of the front monitor detector in longitudinal direction perpendicular to a housing front face on which the window is present, and in the housing, on a rear side of the front monitor detector, part of the flexible substrate incorporating the front monitor detector is inserted in the state of being bended so as to press the front monitor detector to the housing front wall.

2. The optical pickup apparatus as defined in claim 1, wherein part of the flexible substrate on a side anterior to the front monitor detector is inserted in the state of being bended to a rear side of the front monitor detector.

3. The optical pickup apparatus as defined in claim 1, wherein the flexible substrate has a left wing portion and a right wing portion each stretched to a left side and a right side of the front monitor detector with regard to a direction of inserting the flexible substrate in the housing, and each of the left wing portion and the right wing portion of the flexible substrate are inserted in the state of being bended to a rear side of the front monitor detector.

4. The optical pickup apparatus as defined in claim 3, wherein both the left wing portion and the right wing portion of the flexible substrate are in contact with a rear wall and a lateral wall of the housing.

5. A manufacturing method of an optical pickup apparatus, comprising:

forming a catch portion on a flexible substrate of a front monitor-type optical pickup apparatus for emitting a laser light beam from a laser light source to an information recording medium and detecting a quantity of the emitted laser light beam comprising:

a front monitor detector for executing feedback control of output power from the laser light source based on the detected quantity of the laser light beam while reading information from the information recording medium and/or writing information onto the information recording medium with use of the laser light beam, comprising:

a window for taking in the laser light beam;

a housing facing the window for housing the front monitor detector; and a flexible substrate on which the front monitor detector is mounted with its rear surface fixed thereto, wherein, in the housing, a position of the front monitor detector is adjustable; and the flexible substrate incorporating the front monitor detector is provided with a catch portion to be engaged from the outside of the housing;

so as to protrude to outside of a housing;

engaging an engagement member with the catch portion from outside of the housing, and moving the flexible substrate together with the front monitor detector in the housing for adjusting a position of the front monitor detector against the laser light beam; and then cutting away and removing the catch portion extending to outside of the housing.

6. A front monitor-type optical pickup apparatus for emitting a laser light beam from a laser light source to an information recording medium and detecting quantity of the laser light beam by means of a front monitor detector so as to execute feedback control of output power from the laser light source, while reading information from the information recording medium and/or writing information onto the information recording medium with use of the laser light beam, comprising:

a housing having a window for taking in the laser light beam and hosing the front monitor detector so as to faced the window, wherein an inner size of the housing is set larger than a size of the front monitor detector in longitudinal direction perpendicular to a housing front face on which the window is present, in the housing, on a rear side of the front monitor detector, part of a flexible substrate incorporating the front monitor detector is inserted in the state of being bended such that the flexible substrate presses with its restoring force of bended portion the front monitor detector against the housing front wall, and in the housing, a position of the front monitor detector is adjustable.

* * * * *